(12) United States Patent
Henrion

(10) Patent No.: US 7,187,675 B2
(45) Date of Patent: Mar. 6, 2007

(54) METHOD AND A SYSTEM FOR CONTROLLING SERVICE TIMES OF COPIED MULTICAST CELLS IN INPUT MODULES OF AN ASYNCHRONOUS SWITCHING NODE

(75) Inventor: Michel Henrion, Boulogne-Billancourt (FR)

(73) Assignee: Alcatel, Paris (FR)

( * ) Notice: Subject to any disclaimer, the term of this patent is extended or adjusted under 35 U.S.C. 154(b) by 1052 days.

(21) Appl. No.: 10/270,630

(22) Filed: Oct. 16, 2002

(65) Prior Publication Data

US 2003/0076828 A1   Apr. 24, 2003

(30) Foreign Application Priority Data

Oct. 18, 2001   (FR) .................................. 01 13436

(51) Int. Cl.
*H04L 12/56* (2006.01)
*H04J 3/24* (2006.01)

(52) U.S. Cl. ........................ 370/390; 370/312; 370/432

(58) Field of Classification Search ................ 370/312, 370/349, 390–394, 473–475, 432, 229–239, 370/412–419, 395.4, 498
See application file for complete search history.

(56) References Cited

U.S. PATENT DOCUMENTS 6,212,182 B1 *   4/2001   McKeown ................... 370/390
6,628,646 B1 *   9/2003   Angle et al. ................. 370/355
7,023,840 B2 *   4/2006   Golla et al. ................. 370/360
2002/0136230 A1 *   9/2002   Dell et al. ................... 370/416

OTHER PUBLICATIONS

McKeown et al. ("Scheduling multicast cells in an input-queued switch", INFOCOM '96, Fifteenth Annual Joint Conference of the IEEE Computer Societies, Networking the Next Generation. Proceedings IEEE, vol. 1, Mar. 24-28, 1996, pp. 271-278).*

Chen F et al: "A Large Scale Multicast ATM Switch with Input and Output Link Sharing" 1999 IEEE Global Telecommunications Conference. Globecom '99. Seamless Interconnection for Universal Services. Rio De Janeiro, Brazil, Dec. 5-9, 1999, IEEE Global Telecommunications Conference, New York, NY:IEEE, US, vol. 2, Dec. 5, 1999, pp. 1251-1255, XP001016911.

Chen W-T et al: "An Efficient Cell-Scheduling Algorithm for Multicast ATM Switching Systems" IEEE/ACM Transactions on Networking, IEEE Inc. New York, US, vol. 8, No. 4, Aug. 2000, pp. 517-525, XP000959123.

* cited by examiner

*Primary Examiner*—Chi Pham
*Assistant Examiner*—Tri H. Phan
(74) *Attorney, Agent, or Firm*—Sughrue Mion, PLLC

(57) ABSTRACT

The invention relates to a method of controlling the service time of copied multicast cells in input modules of an asynchronous switching node. To minimize the time necessary to command the departure of all of N copied unicast cells, a queue ($Q_t$) is chosen in the input module as a reference queue in which the service time ($SDT_{ref}$) of one of the N copied unicast cells is controlled and in the N—1 other queues a service time is selected closest to the service time instant of the reference queue.

8 Claims, 6 Drawing Sheets

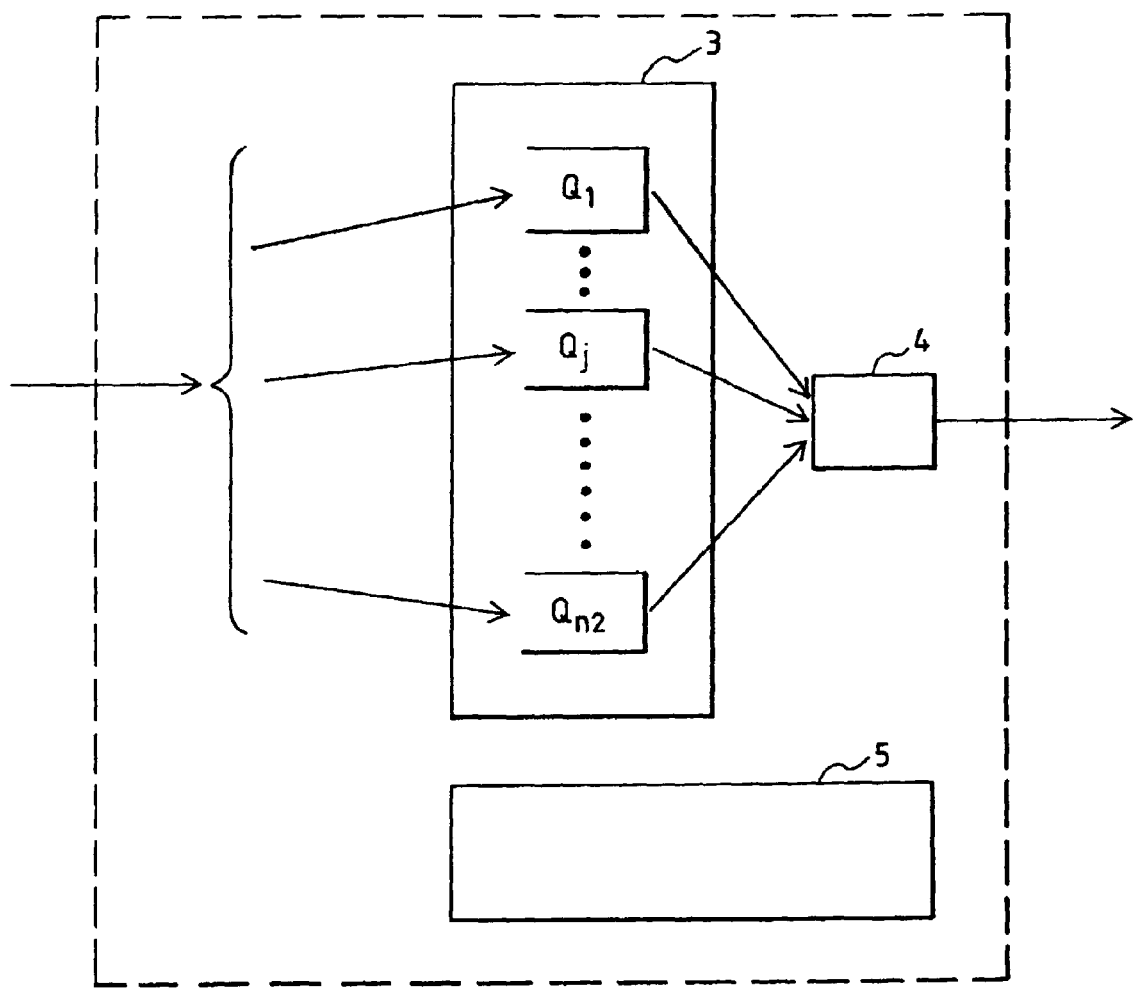

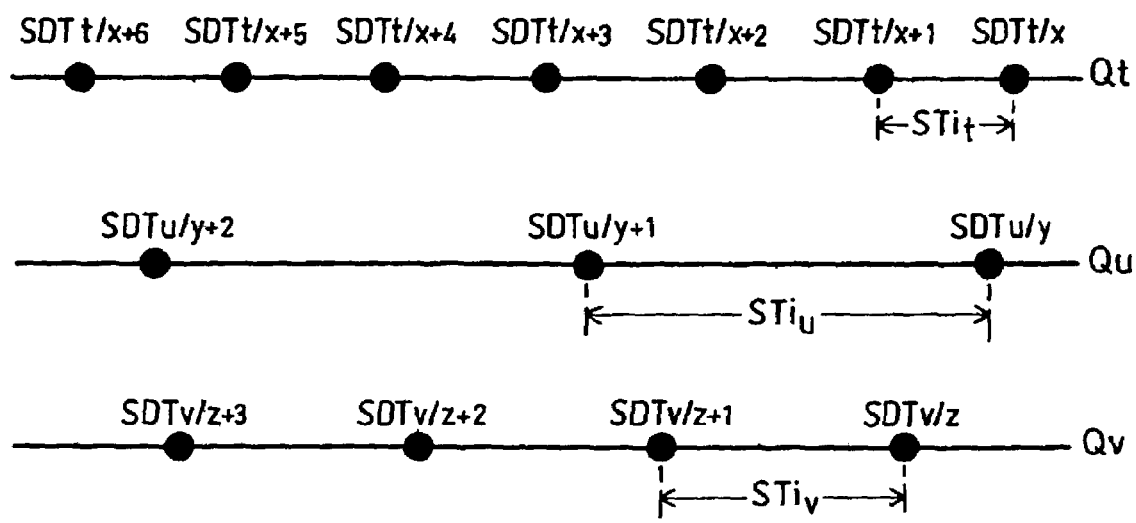

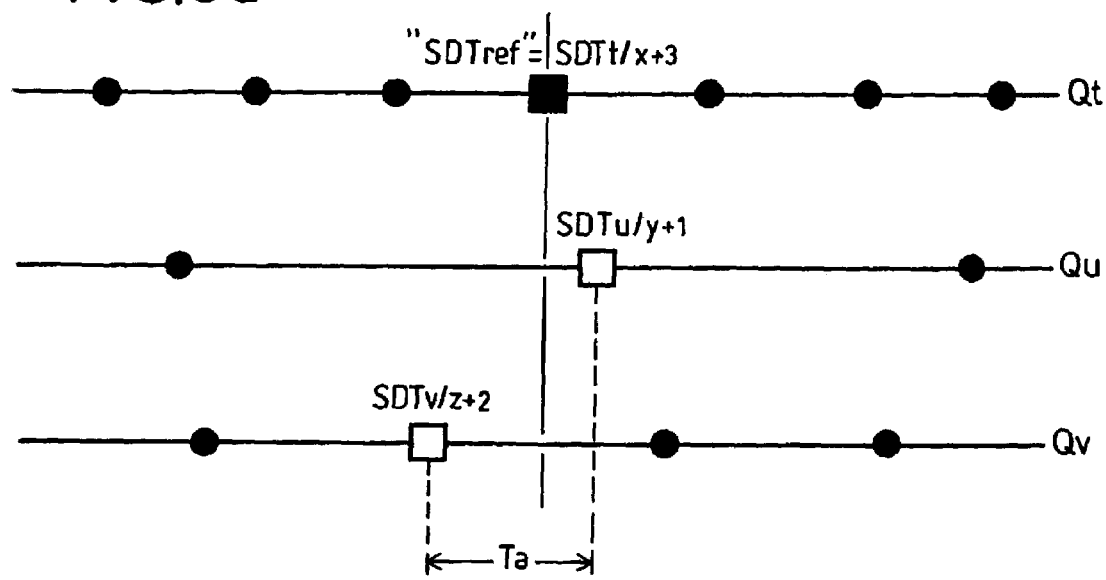
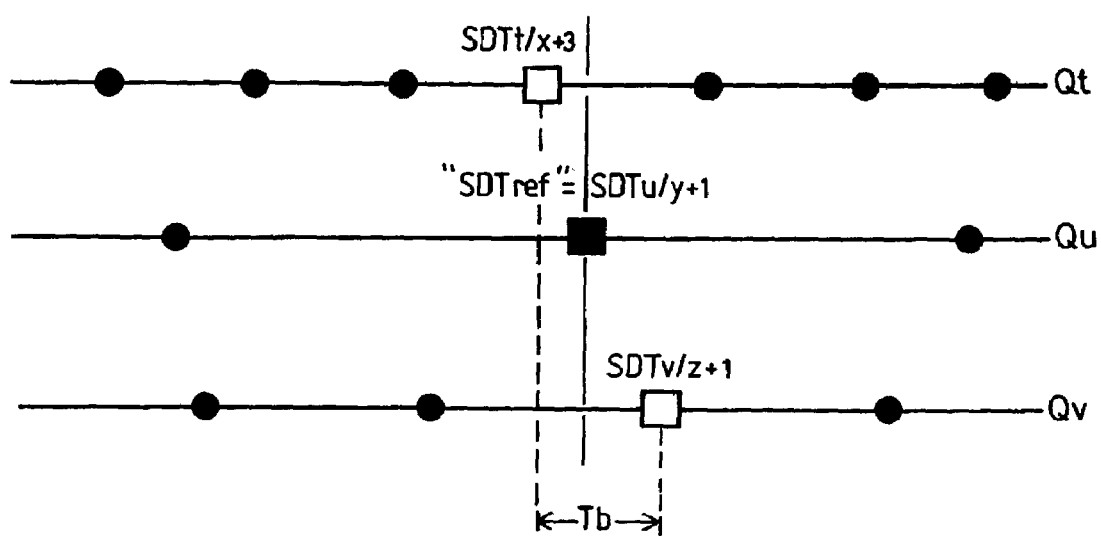

METHOD AND A SYSTEM FOR CONTROLLING SERVICE TIMES OF COPIED MULTICAST CELLS IN INPUT MODULES OF AN ASYNCHRONOUS SWITCHING NODE

The invention relates to a method and a system for switching external data blocks received over transmission lines of an asynchronous communications node in a telecommunications system.

The expression "external data blocks" covers both packets of variable length and cells of fixed length.

BACKGROUND OF THE INVENTION

A switching node considered in the context of the present description comprises input terminal modules and output terminal modules, interconnected by an asynchronous cell switching network. In the remainder of the present description the input and output terminal modules are simply referred to as "input modules" and "output modules", respectively.

In the switching node, an external data block received at an incoming port of an input module must be switched either to an outgoing port of a given output module, in which case it is called a unicast data block, or to outgoing ports of a plurality of output modules, in which case it is called a multicast data block. External data blocks received in the form of variable length packets they are converted into internal format cells in the input modules using techniques in the art. When they have been transferred to the destination output modules via the switching network, the internal format cells are converted back into external data blocks, cells or packets. Within the switching node, the asynchronous switching network switches internal format cells, regardless of the external data block type.

In the input modules of the node, depending on the data block type (unicast or multicast), there are two types of cells to be transferred across the switching network: a first type of cell, called a unicast cell, which must be routed to a given single destination output module, and a second type of cell, called a multicast cell, which must be routed to N given destination output modules of the n2 output modules of the node (where $1<N\leq n2$).

In the case of multicast cells, there are two prior art methods of converting a multicast cell into N cells to be delivered to the N respective destination output modules: in the first method, the input module sends a single example of the multicast cell to the switching network, and it is the network which generates N copied cells from the multicast cell and routes each of the N copied cells to the N respective destination output modules required for the multicast cell. The second method consists in generating N copies of a multicast cell in the input module so that it then sends N unicast cells to the switching network, each cell being addressed to one of the N destination output modules required for that multicast cell. The invention relates to this second method in which the switching network transfers only unicast cells to a given output module, as each multicast cell is converted into N unicast cells in the input module.

In the switching node, the streams of cells transferred across the switching network can cause congestion in the network whenever the overall bit rate of the cell traffic supplied to a given output module and coming from different input modules becomes excessive relative to the bandwidth authorized for access to the output module.

The conventional way to prevent such congestion in the switching network is for each input module to regulate the bit rates at which cells are transferred to each output module of the node so that the overall bit rate of the cell traffic supplied to each output module is not excessive.

To this end, each input module is provided with buffer memories for temporarily storing cells, and the buffer memories are structured in the form of queues, each of which corresponds to a given output module.

That prior art technique is well suited to regulating multicast cell traffic bit rate when multicast cells are sent to only one output module. Using the above technique to regulate the transfer across the switching network of the traffic consisting of all of the cells, which are all unicast cells, to their respective destination output modules can therefore be envisaged a priori. To this end, in each input module, after a multicast cell is converted into N corresponding copied unicast cells addressed to N respective destination output modules of the multicast cell, each of the N copied unicast cells is then placed, along with the normal unicast cells, in the queue relating to its destination output module. Accordingly, each stream of normal and copied unicast cells sent to a given output module from the corresponding queue of an input module can be regulated by a predetermined cell service bit rate allocated to that queue.

However, the problem with implementing this prior art technique applicable to unicast cells in each input module is to distribute beforehand the corresponding N copied cells for each multicast cell into the required N queues.

For each multicast cell, the complexity of the process of conversion into the N copied unicast cells to be placed in the respective queues increases with the number n2 of output modules of the node (since $N\leq n2$). The process is therefore extremely complex for a high-capacity switching node having a large number of output modules. This leads to a circuitry surface area that can be excessive in the case of a parallel distribution or to a processing time that can be long in the case of a sequential distribution. Moreover, a simple distribution of the above type cannot correlate in time the departure instants from the required N queues of the N copied unicast cells corresponding to a given multicast cell.

OBJECTS AND SUMMARY OF THE INVENTION

To eliminate this problem of distributing the N unicast cells corresponding to each multicast cell, the invention relates to a method and to a system for use in the input modules of the asynchronous switching node to control the service times of normal and copied unicast cells in the queues relating to each of the streams of outgoing cells corresponding to the subset of cells supplied by the switching network to each given output module, which method also ensures that the overall bit rate of the traffic comprising all of the cells supplied to each output module is not excessive.

The invention therefore concerns a method of controlling the service time of cells in input modules of an asynchronous switching node which comprises n1 input modules and n2 output modules interconnected by a cell switching network that transfers each cell from an input module to an output module. A unicast cell is addressed to a single given destination output module and a multicast cell is addressed to N given destination output modules of the n2 output modules of that node, each input module itself converting each multicast cell into N corresponding copied unicast cells respectively addressed to the N output modules. Each input module is provided with buffer memories for temporarily storing cells and the service time of a normal or copied unicast cell in a buffer memory triggers its transfer from the input module to the destination output module across said switching network. The service times of all the unicast cells are commanded in queues in each input module relating to each output module, the input module being controlled so that the respective service times of the cells sent from a given queue are separated by a time interval at least equal to the required service time interval between two successive cells of the stream of cells supplied by the switching network to the corresponding output module.

This last condition guarantees that a predetermined cell service bit rate allocated to the corresponding queue is not exceeded for each stream of cells supplied to a given output module.

In the preferred embodiment of the invention, in order to reduce the time necessary for commanding the departure of all the N copied unicast cells ($CUC_a, \ldots, CUC_n$) from the N queues ($Q_a, \ldots, Q_n$) relating to the N destination output modules of a multicast cell (MC), one of the N queues is chosen as a reference queue in which is controlled the service time, referred as the reference service time, of one the N copied unicast cells corresponding to that multicast cell. Additionally, in each of the N−1 other queues concerned, the service time of each of the N−1 other copied unicast cells corresponding to the same multicast cell is controlled by selecting a service time instant of the queue concerned which is closest to the instant of said reference time controlled in said reference queue.

Accordingly, for each of the N−1 queues concerned, the temporal distance between the instant of said service time concerned and the instant of said reference service time is at most equal to said service time interval of that queue concerned.

Then, in accordance with the invention, by using for each of the other N−1 queues concerned a service time selected because it is that nearest the instant of the reference service time, it is possible to distribute into N queues the N copied unicast cells that correspond to the same multicast cell and to command the respective departures of those N cells in a reduced time interval. Additionally, the duration of the reduced time interval can be determined as a function of the cell service bit rates allocated to the N queues.

The invention is particularly simple to put into practice and, firstly, minimizes the duration of traffic peaks generated in an input module by the internal processing of each multicast cell and, secondly, provides a method of determining the duration for which a multicast cell is stored in the buffer memory of the input module.

In one embodiment, the reference queue ($Q_{ref}$) selected is the queue allocated the lowest predetermined cell service bit rate from the various service bit rates allocated to the N queues relating to the N destination output modules of that multicast cell.

In this case, the selection of the reference queue and the selection of said service times concerned in each of the N−1 queues concerned can be predetermined from the instant of the service time that precedes the reference service time retained in the reference queue, and in this situation, said service time concerned selected for each of the N−1 queues concerned is the last service time instant of that queue which precedes the instant of the reference service time in said reference queue.

In one embodiment, for each of the N−1 queues concerned, said service time concerned selected is the first service time instant of that queue which follows the instant of the reference service time in said reference queue.

The invention also relates to an input module including means for implementing the methods defined hereinabove.

BRIEF DESCRIPTION OF THE DRAWINGS

Other features and advantages of the invention will become apparent from the following description of embodiments of the invention, which is given with reference to the accompanying drawings, in which:

FIG. 3 is a theoretical diagram of an input module of a switching node as shown in FIGS. 1 and 2, FIG. 4 is a diagram illustrating an example of a sequence of successive service times of three queues in an input module involved in controlling a multicast cell addressed to three destination output modules relating to those queues, FIGS. 5a and 5b are diagrams illustrating the general operation of the FIG. 4 example of a method according to the invention.

MORE DETAILED DESCRIPTION

The following abbreviations are used in the remainder of the description:
CUC: copied multicast cell,
GOCR: granted output cell rate,
ITM: input termination module,
MC: multicast cell,
OTM: output termination module,
Q: queue,
SDT: scheduled departure time,
STI: service time interval,
UC: unicast cell.

The following subscripts are generally used:
The subscript i designates any input module, e.g. $ITM_i$,
The subscript j designates any output module, e.g. $OTM_j$,
The subscript d designates a considered or given output module, e.g. $OTM_d$, and
The subscript c designates a concerned output module, e.g. $OTM_c$.

Firstly, the theory of an asynchronous switching node in a telecommunications system and the associated problems are briefly described.

Figure 1:
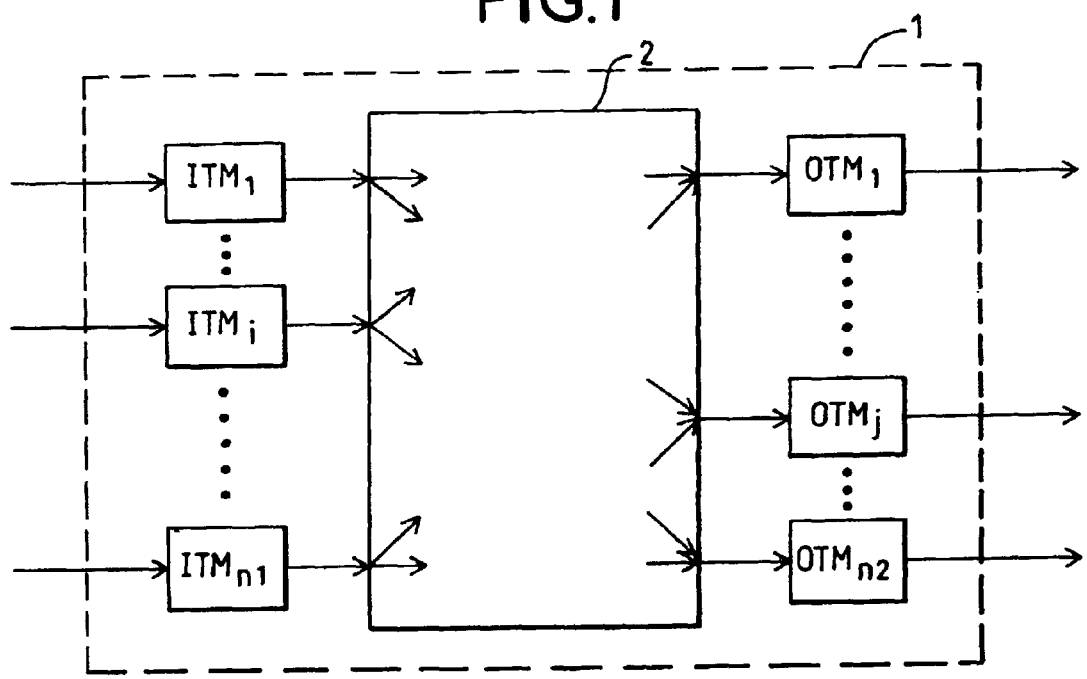
FIG. 1 is a theoretical diagram of a switching node for implementing a control method according to the invention.

As shown in FIG. 1, an asynchronous switching node 1 in a telecommunications system includes n1 input modules $ITM_1, \ldots, ITM_i, \ldots, ITM_{n1}$ which are conventionally connected to n2 output modules $OTM_1, \ldots, ITM_j, \ldots, OTM_{n2}$ by an asynchronous switching network 2. This separate representation of n1 input modules and n2 output modules can correspond either to physically separate input and output modules or to logical separation of the input and output functions in combined terminal modules providing both types of function, in which case the numbers n1 and n2 of modules are generally equal.

The switching node transfers a data block received by any input module $ITM_i$ to any one or more output modules $OTM_j$ via its switching network 2 in accordance with any internal routing mode, for example a connection-oriented or connectionless routing mode.

An external data block received at an incoming port of an input module must be switched either to an outgoing port of a given output module, in which case it is called a unicast data block, or to outgoing ports of a plurality of output modules, in which case it is called a multicast data block.

In the prior art, external data blocks received in the form of variable length packets are converted into internal format cells in the input modules, typically by a process of packet segmentation. Once transferred to the destination output modules via the switching network, the internal format cells are converted back into external data blocks, cells or packets, typically by a process of cell reassembly in the case of external data blocks to be sent in the form of variable length packets. Within the switching node, the asynchronous switching network considered switches internal format cells, regardless of the external data block type, and each cell is transferred from an input module to at least one destination output module.

Two types of cell therefore have to be considered in the input modules of the node: a first type of cell, called a unicast cell UC, must be routed to a single given destination output module, and a second type of cell, called a multicast cell MC, must be routed to N given destination output modules from the n2 output modules of the node ($1 < N \leq n2$).

There are two prior art methods of converting a multicast cell into N cells to be supplied to the N respective destination output modules: In the first method the input module sends the switching network a single example of the multicast cell MC, and the switching network is able to generate N copied cells $Uc_a, \ldots, Uc_n$ from a multicast cell and to route each of the N copied cells to the N respective destination output modules required for that multicast cell. The second method, which is used here, generates N copies of a multicast cell in the input module, so that the latter in fact sends to the switching network N multicast cell each of which is to be sent to one of the N destination output modules required for that multicast cell.

Figure 2:
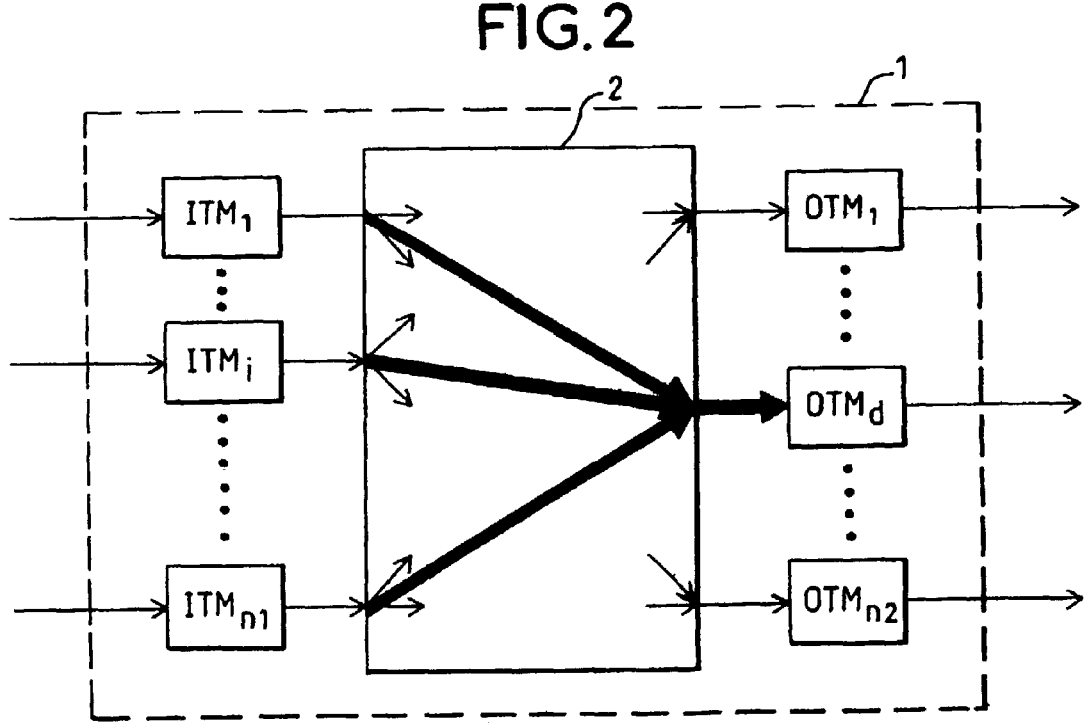
FIG. 2 is a diagram showing outgoing streams of cells supplied to a given output module from different input modules in the switching node shown in FIG. 1.

FIG. 2 shows outgoing streams of cells supplied to a given output module $OTM_d$ from input modules $ITM_1, \ldots, ITM_{n1}$ in the switching node 1. There is a risk of the streams of cells transferred via the switching network creating congestion in the network whenever the overall bit rate of the traffic of cells supplied to an output module, such as the module $OTM_d$, becomes excessive in relation the authorized bandwidth for access to the output module, given that the capacity to transfer cells via the switching network is physically limited by characteristics specific to the network.

A conventional way to avoid congestion in the switching network is for each input module to regulate the bit rates at which cells are transferred to each output module of the node so that the overall bit rate of the traffic of cells supplied to each output module is not excessive.

To this end, using a technique known in the art, and as shown in FIG. 3, each input module is provided with buffer memories 3 for storing cells temporarily and the buffer memories are structured in the form of a plurality of queues $Q_1, \ldots, Q_i, \ldots, Q_{n2}$ each of which corresponds to a given output module.

Using the above technique in an input module $ITM_j$, after processing by input interface and internal cell conversion functions known in the art (and not shown in FIG. 3), the cells are distributed to the queues $Q_1, \ldots, Q_j, \ldots, Q_{n2}$ as a function of their destination output module $OTM_1, \ldots, OTM_j, \ldots, OTM_{2n}$. To extract a cell from a queue and send it to the switching network, a queue multiserver 4 uses one of its service cycles to read the corresponding data in the queue and extract it therefrom. A queue multiserver distributes its service cycles to the queues proportionately to the cell service bit rate $GOCR_j$ allocated to each queue $Q_j$ for transferring the data blocks to be sent to the corresponding output module $OTM_j$. All the queues of an input module are controlled by a queue manager unit 5 assigned to that input module.

The composition of the output modules of the node 1 is not shown in detail here because each output module can be of conventional design with a plurality of registers or memories to receive the data blocks, convert them into internal cells and then transmit those cells to the output interface functions of the input module.

The control functions required by the switching node 1 can be of any type known in the art. The control functions are therefore not shown in the figures, except for the queue manager unit 5 of an input module, shown in FIG. 3, which includes a portion of the characteristic means used to implement the service time control method according to the invention, here considered to constitute a dedicated control mechanism specific to the input modules of the node 1. The queue manager unit 5 is provided with appropriate hardware resources, including processors and memories, and appropriate software resources, in particular, for implementing the control method according to the invention.

The technique known in the art based on the use in the input modules of queues for each output module is suitable for regulating the traffic bit rate of unicast cells addressed only to a single output module. In a queue $Q_d$ relating to a given destination output module $OTM_d$, the service time SDT of a unicast cell UC, which triggers its transfer from the input module to the output module via the switching network, is commanded at an instant determined as a function of the cell service bit rate $GOCR_d$ allocated to that queue, which can be predetermined so that all of the queues $Q_d$ in the input modules $ITM_1, \ldots, ITM_j, \ldots, ITM_{n1}$ relating to the same output module $OTM_d$ generate an overall traffic bit rate of cells supplied to the output module that is not excessive.

This technique can therefore be used to regulate the transfer of all the traffic consisting of normal or copied unicast cells across the switching network to the respective destination output modules. In each input module, after a multicast cell into N has been converted into corresponding copied unicast cells addressed to N respective destination output modules of the multicast cell, each of the N copied unicast cells is placed, along with the normal unicast cells, in the queue relating to its destination output module. Accordingly, each stream consisting of all the normal or copied unicast cells sent to a given output module from the queue corresponding to an input module can be regulated by a predetermined cell service bit rate allocated to that queue.

However, the problem with implementing this prior art technique applicable to unicast cells in each input module is to distribute beforehand the corresponding N copied cells for each multicast cell into the required N queues, the complexity of the process of conversion into the N copied unicast cells increasing with the number n2 of output modules of the node (since $N \leq n2$), so that the process is extremely complex for a high-capacity switching node.

To solve this problem relating to the distribution of the N copied unicast cells $CUC_a, \ldots, CUC_n$ corresponding to each multicast cell MC, the method of the invention controls the service time of the normal and copied unicast cells UC, CUC in the input modules $ITM_i$ of the asynchronous node 1 in queues $Q_1, \ldots, Q_j, \ldots, Q_{n2}$ relating to each of the streams of cells supplied by the switching network 2 to each output module $OTM_1, \ldots, OTM_j, \ldots, OTM_{n2}$, minimizing the duration of the time interval needed to distribute the N copied unicast cells into the N respective queues $Q_a, \ldots, Q_n$, and to command their respective departures.

The control method of the invention is described for an example of a multicast cell $MC_{tuv}$ addressed to three (N=3) destination output modules $OTM_t$, $OTM_u$, $OTM_v$. The FIG. 4 diagram illustrates an example of a sequence of successive service times of each of the three queues $Q_t$, $Q_u$ and $Q_v$ in an input module relating to the three output modules.

For each of the queues $Q_t$, $Q_u$ and $Q_v$, the instants of their respective service times $SDT_t$, $SDT_u$, $SDT_v$ are indicated in the figure by black circles on three respective time lines on which time flows from right to left. The position of their successive service times is determined periodically by a respective service time interval $STI_t$, $STI_u$, $STI_v$ between them. For example, for the queue $Q_t$, the three successive service times $SDT_{t/x}$, $SDT_{t/x+1}$ and $SDT_{t/x+2}$ represented in FIG. 4 are separated by the duration of the service time interval $STI_t$ required between the departures of two successive unicast cells. The service time intervals $STI_t$, $STI_u$, $STI_v$ of the queues $Q_t$, $Q_u$, $Q_v$ are inversely proportional to the respective cell service bit rates $GOCR_t$, $GOCR_u$, $GOCR_v$, allocated to those queues. In the example shown in FIG. 4, the cell service bit rates allocated to the three queues are such that $GOCR_u < GOCR_v < GOCR_t$, which leads to the situation $STI_u > STI_v > STI_t$ shown in FIG. 4.

The operating principle of the method according to the invention is described with the aid of FIG. 5a, which is based on the example of controlling the multicast cell $MC_{tuv}$ in the sequences of service times from FIG. 4. The requirement to send this kind of multicast cell $MC_{tuv}$ that arises at an instant in the central part of the diagram is considered. One of the three queues is then chosen as the reference queue $Q_{ref}$, for example the queue $Q_t$ (so that in this example $Q_{ref}=Q_t$). The reference queue is used to send one of the three copied unicast cells corresponding to the multicast cell $MC_{tuv}$, namely the unicast cell $CUC_t$ addressed to the output module $OTM_t$ relating to the queue $Q_t$, for example at the service time $SDT_{t/x+3}$, which thus constitutes the reference service time $SDT_{ref}$ (so that in this example $SDT_{ref}=SDT_{t/x+3}$), the instant of which is marked by a black square in the figure.

Additionally, to control, in each of the other two (N−1=2) queues concerned $Q_u$ and $Q_v$, the service time concerned of each of the two other unicast cells $CUC_u$ and $CUC_v$ corresponding to the same multicast cell, a service time is selected for the queues $Q_u$ and $Q_v$ that is closest to the instant of the reference service time $SDT_{ref}=SDT_{t/x+3}$ (marked by the vertical line) of the reference queue $Q_{ref}=Q_t$ such as the respective service times $SDT_{u/y+1}$ and $SDT_{v/z+2}$ in the figure, the instants of which are marked by white squares. Accordingly, for the two queues concerned $Q_u$ and $Q_v$, the temporal distance between the instant of their service time $SDT_{u/y+1}$, $SDT_{v/z+2}$ selected in this way and the instant of the reference service time $SDT_{ref}=SDT_{t/x+3}$ is at most equal to the service time interval $STI_u$, $STI_v$ of the queues concerned $Q_u$, $Q_v$.

The three copied unicast cells $CUC_t$, $CUC_u$, $CUC_v$ that correspond to the same multicast cell $MC_{tuv}$ are then distributed into the three queues $Q_t$, $Q_u$, $Q_v$ and the respective departures of the three cells are commanded in a reduced time interval. As indicated in FIG. 5a, the reduced time interval $T_a$ during which the three copied unicast cells $CUC_t$, $CUC_u$, $CUC_v$ are distributed and their respective departures are commanded is delimited by the instants of the farthest away service times, namely the service times $SDT_{u/y+1}$ and $SDT_{v/z+2}$ in the FIG. 5a example.

FIG. 5b, which is again based on the example of controlling the multicast cell $MC_{tuv}$ in the FIG. 4 sequences of service times, illustrates an additional feature of the invention whereby the reference queue $Q_{ref}$ chosen is preferably the queue allocated the lowest predetermined cell service bit rate $GOCR_{min}$. In this case, it is then the queue $Q_u$ that is selected as the reference queue $Q_{ref}$ since, in this example, it has the longest service time interval $STI_u$, and therefore the lowest cell service bit rate $GOCR_{min}=GOCR_u$. The reference queue $Q_u$ is used to send one of the three copied unicast cells corresponding to the multicast cell $MC_{tuv}$, namely the unicast cell $CUC_u$ addressed to the output module $OTM_u$ relating to the queue $Q_u$, for example at the service time $SDT_{u/y+1}$ which then constitutes the reference service time $SDT_{ref}$, the instant of which is marked by a black square.

To control the service time concerned of each of the other two copied unicast cells $CUC_t$ and $CUC_v$ in each of the other two queues concerned $Q_t$ and $Q_v$, the service times closest to the instant of the reference service time $SDT_{u/y+1}$ (marked by the vertical line) of the reference queue $Q_t$ are then selected, such as the respective service times $SDT_{t/x+3}$ and $SDT_{v/z+1}$ in FIG. 5b. For these two queues concerned $Q_t$ and $Q_v$, the temporal distance between the instant of their service times $SDT_{t/x+3}$ and $SDT_{v/z+1}$ selected in this way and the instant of the reference service time $SDT_{ref}=SDT_{u/y+1}$ is at most equal to the service time interval $STI_t$ and $STI_v$ of the queues concerned. As indicated in FIG. 5b, the reduced time interval $T_b$ during which the three copied unicast cells $CUC_t$, $CUC_u$, $CUC_v$ are distributed and their respective departures are commanded is delimited by the instants of the farthest away service times, namely the service times $SDT_{t/x+3}$ and $SDT_{v/z+1}$ in the FIG. 5b example.

The advantage of this preferential selection of the reference queue $Q_{ref}$ will become apparent in relation to an embodiment described later with reference to FIG. 7.

Figure 6A:
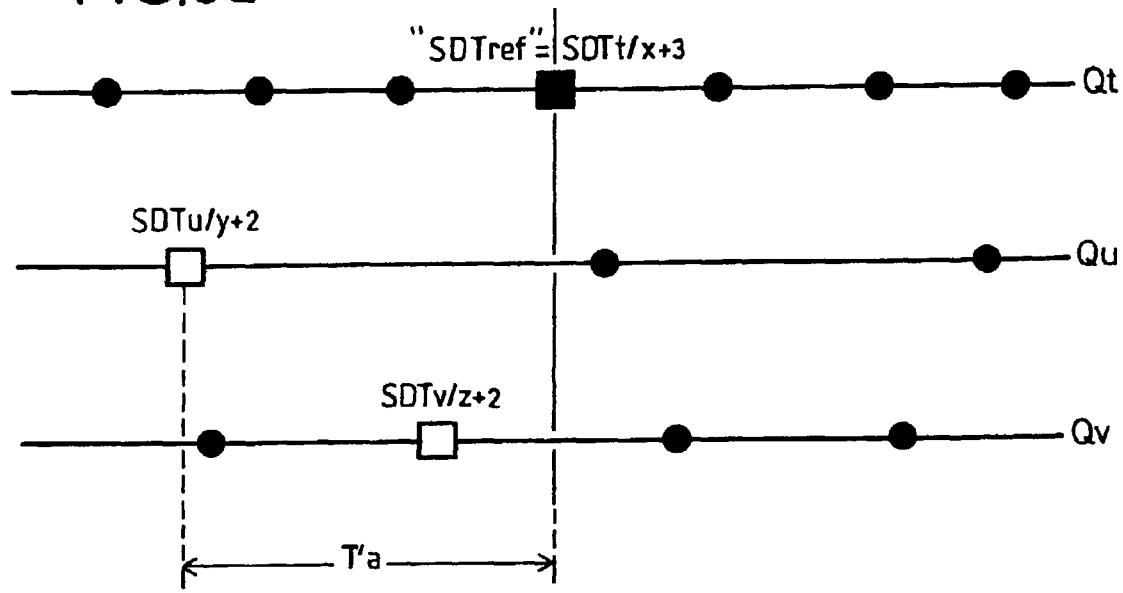
FIGS. 6a and 6b are diagrams illustrating the operation of a first embodiment of the FIG. 4 example of a method according to the invention.
Figure 6B:
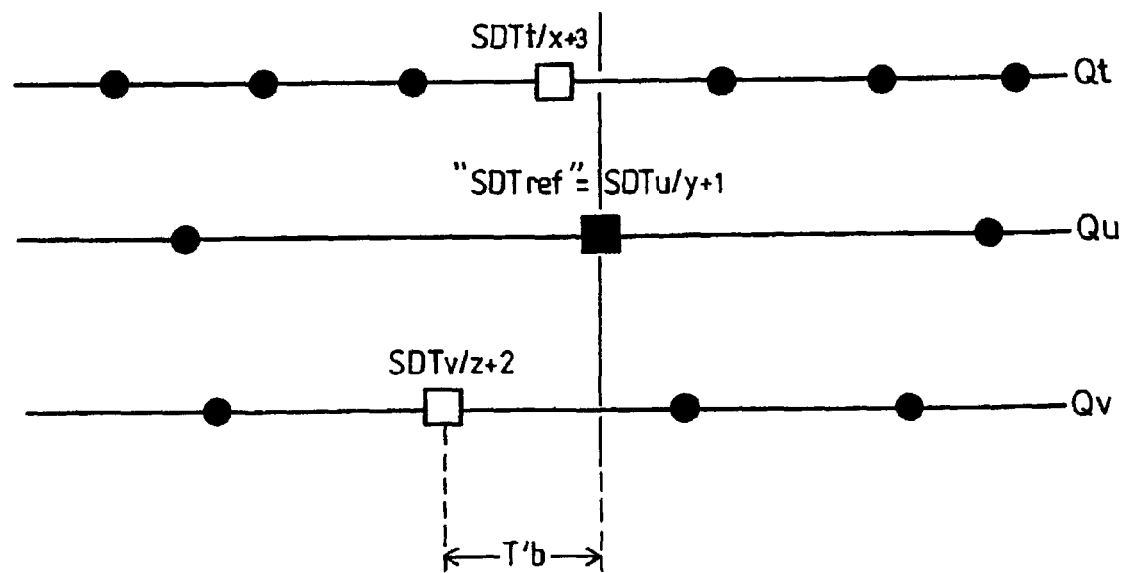

FIGS. 6a and 6b, which are also based on the example of controlling the multicast cell $MC_{tuv}$ in the FIG. 4 sequences of service times, illustrate an embodiment of the invention whereby the service time concerned $SDT_c$ selected for each of the N−1 queues concerned $Q_c$ is the first service time instant of that queue which follows the instant of the reference service time $SDT_{ref}$ in said reference queue $Q_{ref}$.

FIG. 6a illustrates an example analogous to that of FIG. 5a insofar as concerns the choice, from the three (N=3) queues, of the queue $Q_t$ as the reference queue $Q_{ref}$ and of the service time $SDT_{t/x+3}$ as the reference service time $SDT_{ref}$. In this embodiment, the service times $SDT_{u/y+2}$ and $SDT_{v/z+2}$ are then selected for the two queues concerned $Q_u$ and $Q_v$, as they are closest to and beyond the instant of the reference service time $SDT_{t/x+3}$.

As indicated in FIG. 6a, the reduced time interval $T'_a$ during which the three copied unicast cells $CUC_t$, $CUC_u$, $CUC_v$ are distributed and their respective departures are commanded is then delimited, firstly, by the instant of the reference service time $SDT_{ref}$ and, secondly, by the instant of whichever of the service times concerned $SDT_c$ is the farthest away from the service time $SDT_{ref}$ namely the instants of the service times $SDT_{t/x+3}$ and $SDT_{u/y+2}$ in this example.

FIG. 6b illustrates another example analogous to that of FIG. 5b with regard to the choice from the three (N=3) queues of a queue having the lowest cell service bit rate $OGCR_{min}$, i.e. the queue $Q_u$ in this example, as the reference queue $Q_{ref}$, and of the service time $SDT_{u/y+1}$ as the reference service time $SDT_{ref}$. In the same embodiment, the service times $SDT_{t/x+3}$ and $SDT_{u/y+2}$ closest to and beyond the instant of the reference service time $SDT_{u/y+1}$ are then selected for the two queues concerned $Q_t$ and $Q_v$.

As indicated in FIG. 6b, the reduced time interval $T'_b$ during which the three copied unicast cells $CUC_t$, $CUC_u$, $CUC_v$ are distributed and their respective departures are commanded is then delimited, firstly, by the instant of the reference service time $SDT_{ref}$ and, secondly, by the instant of the service times concerned $SDT_c$ which is the farthest away from $SDT_{ref}$, namely by the instants of the service times $SDT_{u/y+1}$ and $SDT_{v/z+2}$ in the FIG. 6b example.

As a general rule, in this embodiment, choosing the service times concerned closest to and beyond the reference service instant guarantees that, irrespective of the relative position of the various sequences of service times in the N queues, the duration of the minimum time interval T' is most equal to whichever is the greatest of the service time intervals $STI_c$ of the N−1 queues concerned $Q_c$, such as the service time interval $STI_u$ or $STI_v$ in the FIG. 6a or 6b example, respectively.

Furthermore, this embodiment has the advantage of being simpler to put into practice, because distribution can be triggered at the reference service time $SDT_{ref}$ by commanding the departure of the copied unicast cell $CUC_{ref}$ corresponding to the reference queue $Q_{ref}$ that has been selected, the position of the service times concerned $SDT_c$ being predetermined as those closest to the instant of the service time $SDT_{ref}$ starting from that instant.

FIG. 7, again based on the example of controlling the multicast cell $MC_{tuv}$ in the FIG. 4 sequences of service times, illustrates another embodiment of the invention in which the reference queue $Q_{ref}$ and the service times concerned $SDT_c$ in each of the N−1 queues concerned $Q_c$ is selected in advance, at the instant of the service time $SDT_{ref}$, that precedes the reference service time $SDT_{ref}$ retained in the reference queue $Q_{ref}$ selected here as a queue having the lowest cell service bit rate $GOCR_{min}$. The service time concerned $SDT_c$ selected for each queue concerned $Q_c$ is then the last service time instant of that queue which precedes the instant of the reference service time $SDT_{ref}$ in said reference queue $Q_{ref}$.

Figure 7:
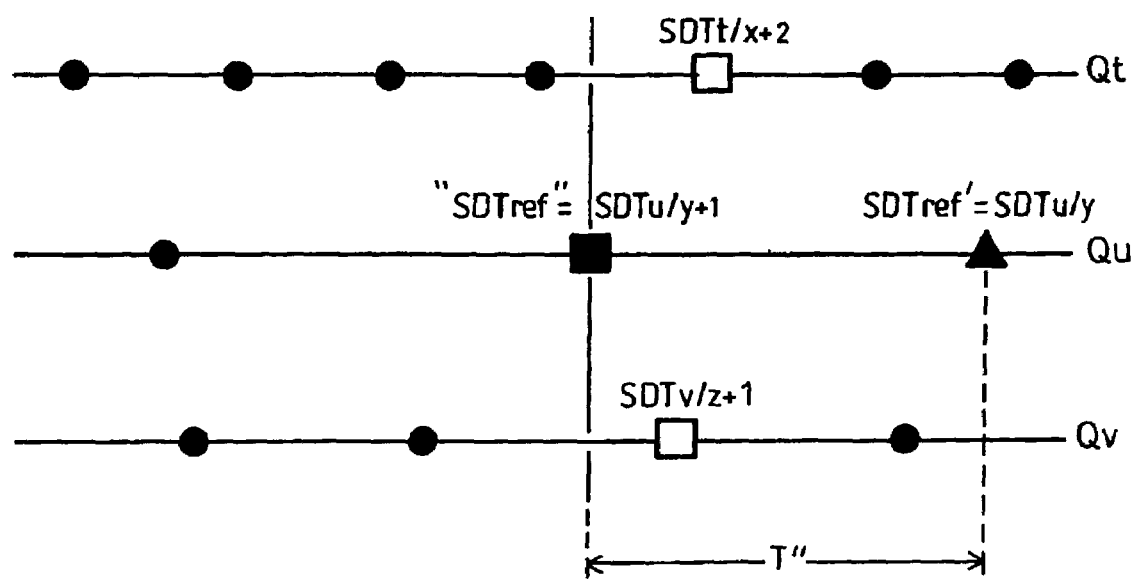
FIG. 7 is a diagram illustrating the operation of a second embodiment of the FIG. 4 example of a method according to the invention.

FIG. 7 illustrates an example analogous to that of FIGS. 5b and 6b with regard to the choice, from the three (N=3) queues, of a queue having the lowest cell service bit rate $GOCR_{min}$, which is the queue $Q_u$ in this example, as the reference queue $Q_{ref}$ and the service time $SDT_{u/y+1}$ as the reference service time $SDT_{ref}$. In this embodiment, this reference queue $Q_{ref}=Q_u$ is then selected in advance during its service time $SDT_{ref}=SDT_{u/y}$, marked by a black triangle in FIG. 7, which precedes its reference service time $SDT_{ref}=SDT_{u/y+1}$.

Furthermore, during this service time $SDT_{ref}$, the service times $SDT_{t/x+2}$ and $SDT_{v/z+1}$ preselected for the two queues concerned $Q_t$ and $Q_v$ are those closest to and preceding the instant of the reference service time $SDT_{ref}=SDT_{u/y+1}$. It may be noted that in this embodiment, for each of the N−1 queues concerned, there always exists at least one service time that can be selected during the time interval T" between the service times $SDT_{ref}$, and $SDT_{ref}$, since these two consecutive service times of the selected queue $Q_{ref}$ are themselves separated by a service time interval $STI_{ref}$ that corresponds to the lowest cell service bit rate $GOCR_{min}$, and which is therefore at least as long as each of the service time intervals of the other N−1 queues concerned $Q_c$.

In the example illustrated in FIG. 7, the reduced time interval T" during which the three copied unicast cells $CUC_t$, $CUC_u$, $CUC_v$ are distributed and their respective departures are commanded is then delimited by the instants of the service times $SDT_{ref}=SDT_{t/x+1}$ and $SDT_{ref}=SDT_{t/x+2}$. As a general rule, in this embodiment, preselecting as the service times concerned $SDT_c$ those closest to and preceding the reference service instant $SDT_{ref}$ also guarantees that, regardless of the relative position of the various service time sequences of the N queues, the duration of the minimum time interval T" is equal to the greatest of the service time intervals of the N queues, namely the service time interval $STI_{ref}$ of the queue $Q_{ref}$ selected here as having the lowest cell service bit rate $GOCR_{min}$, such as the service time interval STI" in the FIG. 7 example.

This embodiment also has the advantage of being simpler to put into practice, because it allows triggering of distribution at the service time $SDT_{ref}$ that precedes the reference service time $SDT_{ref}$ and commanding the departure of the N copied unicast cells during the time interval between the two consecutive service times $SDT_{ref}$, and $SDT_{ref}$ of the reference queue $Q_{ref}$, predetermining the position of the service times concerned $SDT_c$ as those closest to and preceding the instant of the service time $SDT_{ref}$.

What is claimed is:

1. A method of controlling the service time of cells in input modules of an asynchronous switching node which comprises n1 input modules ($ITM_1$, ..., $ITM_i$, ..., $ITM_{n1}$) and n2 output modules ($OTM_1$, ..., $OTM_j$, ..., $OTM_{n2}$) interconnected by a cell switching network that transfers each cell from an input module to an output module, a unicast cell (UC) being addressed to a single given destination output module ($OTM_d$) and a multicast cell (MC) being addressed to N given destination output modules ($OTM_a$, ..., $OTM_n$) of the n2 output modules of that node, each input module itself converting each multicast cell into N corresponding copied unicast cells ($CUC_a$, ..., $CUC_n$) respectively addressed to the N output modules ($OTM_a$, ..., $OTM_n$), each input module being provided with buffer memories for temporarily storing cells and said service time of a normal or copied unicast cell (UC; CUC) in a buffer memory triggering its transfer from the input module to the destination output module across said switching network, and the service times of all the unicast cells (UC; CUC) being commanded in queues ($Q_1$, ..., $Q_j$, ..., $Q_{n2}$) in each input module relating to each output module ($OTM_1$, ..., $OTM_j$, ..., $OTM_{n2}$), the input module being controlled so that the respective service times of the cells sent from a given queue ($Q_j$) are separated by a time interval at least equal to the required service time interval ($STI_j$) between two successive cells of the stream of cells supplied by the switching network to the corresponding output module ($OTM_j$), in order not to exceed for each stream of cells supplied to a given output module ($OTM_j$) a predetermined cell service bit rate ($GOCR_j$) allocated to the corresponding queue ($Q_j$), characterized in that, in order to reduce the time necessary for commanding the departure of all the N copied unicast cells ($CUC_a$, ..., $CUC_n$) from the N queues ($Q_a$, ..., $Q_n$) relating to the N destination output modules of a multicast cell (MC), one of the N queues is chosen as a reference queue ($Q_{ref}$) in which is controlled the service time, referred as the reference service time ($SDT_{ref}$), of one the N copied unicast cells ($CUC_{ref}$) corresponding to that multicast cell (MC), and in that, in each of the N−1 other queues concerned ($Q_c$), the service time ($SDT_c$) of each of the N−1 other copied unicast cells ($CUC_c$) corresponding to the same multicast cell (MC) is controlled by selecting a service time instant of the queue concerned ($Q_c$) which is closest to the instant of said reference time ($SDT_{ref}$) controlled in said reference queue ($Q_{ref}$) so that, for each of the N−1 queues concerned ($Q_c$), the temporal distance between the instant of said service time concerned ($SDT_c$) and the instant of said reference service time ($SDT_{ref}$) is at most equal to said service time interval ($STI_c$) of that queue concerned.

2. A method according to claim 1, characterized in that the reference queue ($Q_{ref}$) selected is the queue allocated the lowest predetermined cell service bit rate ($GOCR_{min}$) from the various service bit rates ($GOCR_a, \ldots, GOCR_n$) allocated to the N queues ($Q_a, \ldots, Q_n$) relating to the N destination output modules ($OTM_a, \ldots, OTM_n$) of that multicast cell (MC).

3. A method according to claim 1, characterized in that, for each of the N−1 queues concerned ($Q_c$), said service time concerned ($SDT_c$) selected is the first service time instant of that queue which follows the instant of the reference service time ($SDT_{ref}$) in said reference queue ($Q_{ref}$).

4. A method according to claim 2, characterized in that the selection of said reference queue ($Q_{ref}$) and the selection of said service times concerned ($SDT_c$) in each of the N−1 queues concerned ($Q_c$) are predetermined from the instant of the service time ($SDT_{ref}$) that precedes the reference service time ($SDT_{ref}$) retained in the reference queue ($Q_{ref}$) and in that said service time concerned ($SDT_c$) selected for each of the N−1 queues concerned ($Q_c$) is the last service time instant of that queue which precedes the instant of the reference service time ($SDT_{ref}$) in said reference queue ($Q_{ref}$).

5. An input module in an asynchronous switching node comprising n1 input modules ($ITM_1, \ldots, ITM_i, \ldots, ITM_{n1}$) and n2 output modules ($OTM_1, \ldots, OTM_j, \ldots, OTM_{n2}$) interconnected by a cell switching network and control means for transferring each cell from an input module to an output module, a unicast cell (UC) being addressed to a single given destination output module ($OTM_d$) and a multicast cell (MC) being addressed to N given destination output modules ($OTM_a, \ldots, OTM_n$) of the n2 output modules of that node, each input module being provided with means for converting each multicast cell into N copied unicast cells ($CUC_a, \ldots, CUC_n$) respectively addressed to the N output modules ($OTM_a, \ldots, OTM_n$) and buffer memories for temporarily storing cells in each input module, the service time of a normal or copied unicast cell (UC; CUC) in a buffer memory triggering its transfer from the input module to the destination output module across said switching network, and the service times of all the unicast cells (UC; CUC) being commanded in queues ($Q_1, \ldots, Q_j, \ldots, Q_{n2}$) in each input module relating to each output module ($OTM_1, \ldots, OTM_j, \ldots, OTM_{n2}$), the input module being controlled so that the respective service times of the cells sent from a given queue ($Q_j$) are separated by a time interval at least equal to the required service time interval ($STI_j$) between two successive cells of the stream of cells supplied by the switching network to the corresponding output module ($OTM_j$) so that a predetermined cell service bit rate ($GOCR_j$) allocated to the corresponding queue ($Q_j$) is not exceeded for each stream of cells supplied to a given output module ($OTM_j$), which input module is characterized in that, in order to reduce the time necessary for commanding the departure of the set of all N copied unicast cells ($CUC_a, \ldots, CUC_n$) from the N queues ($Q_a, \ldots, Q_n$) relating to the N destination output modules of a multicast cell (MC), the means in the input module for converting each multicast cell into N corresponding copied cells ($CUC_a, \ldots, CUC_n$) include first control means for choosing one of the N queues as a reference queue ($Q_{ref}$) in which the departure of one of the N copied unicast cells ($CUC_{ref}$) corresponding to that multicast cell (MC) is commanded at a reference service time ($SDT_{ref}$) and second control means for determining, in each of the N−1 other queues concerned ($Q_c$), the choice of the service time concerned ($SDT_c$) for commanding the departure of each of the N−1 other copied unicast cells ($CUC_c$) corresponding to the same multicast cell (MC), by selecting a service time instant of that queue concerned ($Q_c$) which is closest to the instant of said reference service time ($SDT_{ref}$) controlled in said reference queue ($Q_{ref}$) so that, for each of the N−1 queues concerned ($Q_c$), the temporal distance that separates the instant of said service time concerned ($SDT_c$) from the instant of said reference service time ($SDT_{ref}$) is at most equal to said service time interval ($STI_c$) of that queue concerned.

6. An input module according to claim 5, characterized in that the first control means are adapted to choose as the reference queue ($Q_{ref}$) the reference queue allocated the lowest predetermined cell service bit rate ($GOCR_{min}$) of the various service bit rates ($GOCR_a, \ldots, GOCR_n$) allocated to the N queues ($Q_a, \ldots, Q_n$) relating to the N destination output modules ($OTM_a, \ldots, OTM_n$) of that multicast cell (MC).

7. An input module according to claim 5, characterized in that the second control means are adapted to select as the service time concerned ($SDT_c$) for each of the N−1 queues concerned ($Q_c$) the first service time instant of that queue which follows the instant of the reference service time ($SDT_{ref}$) in said reference queue ($Q_{ref}$).

8. An input module according to claim 6, characterized in that the first control means are adapted to predetermine the reference queue ($Q_{ref}$) selected from the instant of the service time ($SDT_{ref}$) that precedes the reference service time ($SDT_{ref}$) retained in that reference queue and in that the second control means are adapted to preselect as the service time concerned ($SDT_c$) for each of the N−1 queues concerned ($Q_c$) the last service time instant of that queue concerned which precedes the instant of the reference service time ($SDT_{ref}$) in said reference queue ($Q_{ref}$).

* * * * *